United States Patent Office 2,969,369
Patented Jan. 24, 1961

2,969,369

DERIVATIVES OF 3-PHENYL-5,6-DIHYDRO-IMIDAZO-[2.1-b]THIAZOLES

Carl Peter Krimmel, Mundelein, Ill., assignor to G. D. Searle & Co., Chicago, Ill., a corporation of Delaware No Drawing. Filed Oct. 23, 1959, Ser. No. 848,237

7 Claims. (Cl. 260—306.7)

The present invention relates to derivatives of 3-phenyl-5,6-dihydroimidazo-[2.1-b]thiazoles and specifically to the compounds of the structural formula

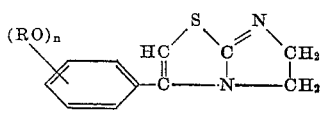

wherein R is hydrogen or methyl and $n$ is a positive integer less than 4.

The compounds of this invention are conveniently prepared by heating 2-imidazolidinethione with a molecular equivalent of an α-haloacetophenone of the formula

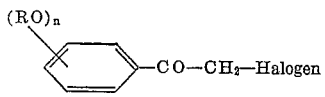

The compounds of this invention have valuable pharmacological activities. They have a positive inotropic effect on the heart. They have a cortisone-like anti-inflammatory effect, for instance on iritis, but they lack some of the undesirable side effects of cortisone. Further, they have anorectic activity. While the ethers produce a hypotensive effect the phenols have an epinephrine-like action on the circulation.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

This invention will be illustrated in further detail by the following examples. The details set forth in these examples are not to be construed as limiting it in spirit or in scope. It will be apparent to those skilled in the art that numerous modifications can be made with regard to reagents and reaction conditions without departing from the scope of the invention. In these examples quantities are indicated as parts by weight. Temperatures are given uncorrected in degrees centigrade (° C.).

The present invention is a continuation-in-part of copending application Serial No. 697,803, filed November 21, 1957, and which is now abandoned.

*Example 1*

A mixture of 5.1 parts of 2-imidazolidinethione, 48 parts of absolute ethanol, and 8.5 parts of 4-(chloroacetyl)phenol is refluxed and stirred on a steam bath for 25 minutes after which the hot reaction mixture is filtered. The filter cake is washed with 20 parts of absolute ethanol and air dried. The resulting product is recrystallized from methanol using activated carbon for decolorization. The hydrochloride of 3-(4-hydroxyphenyl)-5,6-dihydroimidazo-[2.1-b]thiazole is obtained as a pale pink crystalline powder which begins to darken at about 290° C. and decomposes to a black frothy liquid between 316 and 322° C. It is soluble in warm water and gives a gray ferric chloride test.

*Example 2*

To a refluxing mixture of 5.5 parts of 2-imidazolidinethione and 100 parts of absolute ethanol are added 10.0 parts of 4-(chloroacetyl)resorcinol. The reaction mixture is stirred and refluxed for 10 minutes. A solid product separates which is recovered by suction filtration of the hot reaction mixture. It is twice recrystallized by dissolving in hot absolute ethanol, decolorizing with activated carbon, filtering, concentrating the filtrate, and cooling. The hydrochloride of 3-(2,4-dihydroxyphenyl)-5,6-dihydroimidazo-[2.1-b]thiazole thus obtained is a white, crystalline, water-soluble product which gives an orange-brown ferric chloride test and melts to a black frothy liquid at about 284–287° C. The base has the structural formula

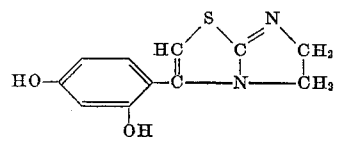

*Example 3*

To a stirred, refluxing mixture of 5.5 parts of 2-imidazolidinethione and 32 parts of absolute ethanol are added 10.0 parts of 4-(chloroacetyl)pyrocatechol. The reaction mixture is refluxed for 10 minutes, cooled, scratched to induce crystallization, and filtered. The solid is recrystallized by dissolving in hot absolute ethanol, treating with activated carbon, filtering, and concentrating on a steam bath under vacuum until crystals separate. The product is recovered from the cooled concentrate as a water soluble cream-colored powder which melts at about 244–251° C. In the presence of ferric chloride, aqueous solutions of the hydrochloride of 3-(3,4-dihydroxyphenyl) - 5,6 - dihydroimidazo - [2.1-b]thiazole give colors which vary from violet to green depending upon the concentration of the ferric chloride.

*Example 4*

To a refluxing mixture of 2.9 parts of 2-imidazolidinethione and 40 parts of absolute ethanol are added 6.0 parts of 4-(chloroacetyl)veratrole. Refluxing is continued for 30 minutes, after which the mixture is cooled, and the solid product is recovered by suction filtration. The product is recrystallized by dissolving it in methanol, adding isopropanol, and driving off the methanol by vacuum distillation. Upon cooling of the residual isopropanol solution, a white powdery crystalline product is obtained. The hydrochloride of 3-(3,4-dimethoxyphenyl) - 5,6 - dihydroimidazo - [2.1 - b]thiazole melts at about 250–252° C. to a brown liquid with gas evolution.

The hydrochloride of 3-(4-methoxyphenyl)-5,6-dihydroimidazo-[2.1-b]thiazole is obtained by substitution of an equivalent amount of 4-(chloroacetyl)anisole for the 4-(chloroacetyl)veratrole in the foregoing procedure.

*Example 5*

To a refluxing mixture of 1.8 parts of 2-imidazolidinethione and 40 parts of absolute ethanol are added 4.3 parts of α-chloro-3,4,5-trimethoxyacetophenone. The resultant clear, colorless reaction mixture is refluxed for one hour. After cooling the crystalline precipitate is collected on a filter and dried. The hydrochloride of 3-(3,4,5 - trimethoxyphenyl) - 5,6-dihydroimidazo - [2.1-b] thiazole is thus obtained in white, water-soluble crystals melting at about 272-273° C. with decomposition to a frothy, brown liquid.

What is claimed is:
1. A compound of the structural formula

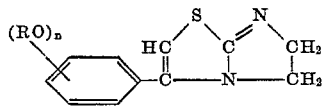

wherein R is a member of the class consisting of hydrogen and methyl and $n$ is an integer greater than zero and smaller than four.

2. 3-(hydroxyphenyl)-5,6-dihydroimidazo-[2.1-b]thiazole.

3. 3-(dihydroxyphenyl)-5,6-dihydroimidazo-[2.1-b]thiazole.

4. 3-(2,4-dihydroxyphenyl)-5,6-dihydroimidazo-[2.1-b]thiazole.

5. 3-(3,4-dihydroxyphenyl)-5,6-dihydroimidazo-[2.1-b]thiazole.

6. 3-(3,4-dimethoxyphenyl)-5,6-dihydroimidazo-[2.1-b]thiazole.

7. 3 - (3,4,5 - trimethoxyphenyl) - 5,6-dihydroimidazo-[2.1-b]thiazole.

References Cited in the file of this patent

Wilson et al.: J. Chem. Soc. (London), vol. 1955, pp. 2943–2948.